United States Patent
Sterner, Sr.

[11] Patent Number: 6,021,629
[45] Date of Patent: Feb. 8, 2000

[54] REGISTRATION SYSTEM FOR SEALED TRAY PACKAGING MACHINE

[75] Inventor: Robert A. Sterner, Sr., Oakford, Pa.

[73] Assignee: SKS Equipment Co, Inc., Warminster, Pa.

[21] Appl. No.: 09/169,100

[22] Filed: Oct. 12, 1998

[51] Int. Cl.[7] .............................. B65B 7/28; B65B 57/04
[52] U.S. Cl. ................................. 53/471; 53/51; 53/64; 53/282; 53/329.4
[58] Field of Search .................................. 53/51, 64, 141, 53/282, 329.4, 471

[56] References Cited

U.S. PATENT DOCUMENTS

| | | | |
|---|---|---|---|
| 3,140,573 | 7/1964 | Buttolph | 53/51 |
| 3,238,691 | 3/1966 | Miller | 53/51 |
| 3,411,767 | 11/1968 | Moser | 53/51 |
| 3,706,183 | 12/1972 | Talarico | 53/329.4 |
| 3,861,983 | 1/1975 | Harrell | 53/51 |

*Primary Examiner*—John Sipos
*Attorney, Agent, or Firm*—John J. Simkanich

[57] ABSTRACT

A registration system for a packaging machine, which machine seals tray tops with thermoplastic film. The trays are carried through the machine on a moving conveyor and the sealing film is fed in a ribbon from a feed roll to move in a position above the line of trays carried on the moving conveyor. The film ribbon carries printing or decorations, in repetitive segments, which must each be centered on a respective tray top when the film is sealed thereto. Repetitive registration marks carried on the film ribbon indicate the position of each film segment as it moves toward a heat seal station. The registration marks are optically sensed in time with the timing pulses of the packaging machine. When miss-registration is sensed the film position, relative to the leading edge of the tray adjacent to and next to enter the heat seal station, is indexed forward a predetermined increment by a downward operating blade and then a heat bar contacts the film and tacks it to the leading edge of that tray. The movement of the conveyor, rolls assisting the movement of the film, the indexing blade, the heat station, and a timing cam are controlled by a chain drive from a single motor. Miss-registration indexing continues each successive timing cycle until registration is achieved.

18 Claims, 4 Drawing Sheets

REGISTRATION SYSTEM FOR SEALED TRAY PACKAGING MACHINE

BACKGROUND OF THE INVENTION

The present invention is relates to sealed tray packaging machines and specifically the registration, of the film seal and the tray top face, in such packaging machines. Sealed tray packaging machines usually package goods in a tray which is then sealed on its top face with a heat sealable thermoplastic film heat molded onto the edge of the tray. Often the top face sealed film has a see through window or carries printing or other indicia. Usually the film is fed in a ribbon from a large roll with the indicia sequentially duplicated on the ribbon in repetitive segments corresponding to the spacing, established by the packaging machine, for each tray.

Registration is the process of synchronizing machine operations for the proper positioning of the sealing film material over each tray during the sealing operation. It is a process for the coordination of the timing of a packaging machine operations and the spacing of the juxtaposed members so that each film section (segment), taken off of the ribbon from the roll, is properly positioned when sealed to a respective tray. Often the film carries a series of recognition marks, i.e., "registration marks", for indicating those relative positions of each tray top segment printed on the film. Thereby, each film section (segment) is properly centered over a tray when the sealing operation is performed.

The synchronization of packaging machine operations and the synchronization of tray sealing packaging machine operations has always been an engineering concern with conveyor belt type machines. With the advent of sealed tray packaging machines and packaging machines producing heat sealed compound packages, registration has also been a concern.

Vetter, U.S. Pat. No. 3,979,877, shows a packaging machine with web registration. Registration marks carried on the film are sensed and the reciprocal drive which advances the product tray conveyor is controlled to maintain registration. This control increases the drive extension to increase the step movement distance. Thus registration is maintained by controlling conveyor operation with sensed film advance.

Eaves, et al., U.S. Pat. No. 4,574,566 show a wrapping machine which has independent closed-loop controlled, servo motor drive circuits for each of the film drive, the product (conveyor) drive, and the cut/seal head operation. A film "eye spot" sensor (photo eye) provides a registration signal (miss-registration signal) which is fed to the product drive controller circuit. The product drive signal is adjusted to change the product drive speed to bring the product into registration with the film advance. Extensive control logic is implemented in electronic processor routines and stored logic programs.

Heaney, U.S. Pat. No. 4,722,168 shows a registration control for a wrapping machine. A photoelectric sensor and a radiation transmitter sense film position with respect to the conveyor and package position. When miss-registration occurs, the sealing operation of the machine is suspended. The film is advanced to bring the film into registration with the machine. The amount of film advancement is calculated by a computer which then controls the film drive during said film-to-machine adjustment period. When the proper registration is achieved, the normal wrapping machine operation is resumed.

Wylie, U.S. Pat. No. 4,744,202 shows a method and apparatus for controlling the relative position of a web film to the synchronization cam of a sealing machine. Registration marks on the film are sensed by a photocell circuit. The speed of the film drive (film advancement) is adjusted by applying a brake to the film drive subsystem.

Barker, U.S. Pat. No. 4,807,420 shows a horizontal conveyor form fill and seal packaging machine driven by a digitally controlled stepper motors. The product drive and the web drive individual stepper motors operations are controlled from a central processor unit (CPU). The drive signals (speed control) to each of these motors is adjusted by the CPU in response to product and web sensors.

Cherney, U.S. Pat. No. 4,860,522 discloses a machine with individual drives for film and conveyor movement. Film movement is adjusted by changing the drive speed which results in a change in the amount of film pull. A computerized film registration mark and window monitoring system calculates for small changes in film drive speeds. These speeds are then computer controlled.

Francioni, U.S. Pat. No. 4,914,889 shows a machine whose operation is synchronized from a single drive motor thorough electronically controlled positioning. A drive take off for the conveyor and a drive take off for the film advance are adjusted by the control of a belt transmission system. Miss-registration is compensated for by adjusting the drive speed of the conveyor and the drive speed of the film feeder with respect to one another.

Muller, U.S. Pat. No. 5,642,604 shows a spacing conveyor for moving cans (fill packages) through a packaging machine. The movement of the packages can be adjusted by adjusting the speed of the sprocket conveyor which moves the cans.

Manly, U.S. Pat. No. 5,727,366 discloses a registration control, which is computer software logic implemented, for controlling a continuous operating package filling machine. The position and speed of the packaging material is adjusted for miss-registration. A servo motor driven nip roller system is used to feed the film to the seal station. Registration marks along the film are monitored for miss-registration. The movement (speed) of the servo motor drive is computer controlled to index the film registration forward or backward (faster or slower movement) in synchronization with the operation of the packaging machine.

With improvements in computer miniaturization, reduction in cost of microprocessors, increased sophistication in computer programming and more sophisticated electric and digital stepping motor controls, the industry has move registration in packaging machines into ever more sophisticated designs. These structures are more expensive to build and to maintain. They require calibration, and are subject to loss of such calibration from rough handling and wear.

What is desired a registration system and method of registration for a packaging machine, specifically a sealed tray packaging machine, which is less complicated in its logical controls and which is durable enough to maintain its function when subjected to rough handling and wear.

What is further desired is such a sealed tray packaging machine wherein its drive operational control structure assures that the various operations of the machine always remain in synchronization.

What is further desired is registration correction in such a sealed tray packaging machine of the sealing film positioning, respective to tray positioning, which provides such correction without effecting the synchronized operation of the machine.

SUMMARY OF THE INVENTION

The objectives of the present invention are achieved in a sealed tray packaging machine having a centralized chain drive for operating each of the components of the machine in synchronization. This packaging machine includes a chain driven plate conveyor, wherein each plate has a receiving socket for holding an individual tray. Sealing film is fed above the tray carrying conveyor, from a roll as a continuous ribbon. This film ribbon carries sequentially printed segments (sections) which are respectively to be centered over a respective tray during a sealing operation. A heat seal station has a roller heat drum which seals the film to each tray top edge, as they pass through the heat seal station and under the drum. This pulls the sealing film ribbon into the sealing station in parallel with the movement of the trays on the conveyor. At the discharge side of the heat seal station a rotating cutter cuts the film ribbon to separate individual tray packages.

The operation of each of these components is driven in synchronization by being directly driven off of the central drive motor through a chain and sprocket system. The speed of all components is kept constant through this chain drive.

A series of registration marks or indicators are sequentially printed on the film to mark the beginning of each section. An optical monitor scans the film as it passes the monitor position on the packaging machine. This monitor feeds its signal to a central controller which determines the machine as being within registration or as being in miss-registration. A rotating cam driven by the chain drive from the central motor generates a timing signal for sensing each film registration mark in synchronization with the machine operation.

When the film is out of registration, the film is indexed forward a predetermined and fixed incremental distance by a blade which pulls the film forward with respect to the front edge (lip) of that tray which is about to enter the heat seal station. A heat bar is brought in contact with the leading (front) edge of that tray to tack the film position and maintain the indexed adjustment for successive trays.

The indexing step carried on by the blade occurs when the blade is lowered down upon the film to extend it downward towards a space between the conveyor plate carrying the tray to be film-tacked and the conveyor plate preceding it.

DESCRIPTION OF THE DRAWINGS

The features, advantages and operation of the present invention will become readily apparent and further understood from a reading of the following detailed description with the accompanying drawings, in which like numerals refer to like elements, and in which.

DETAILED DESCRIPTION OF THE INVENTION

Figure 1:
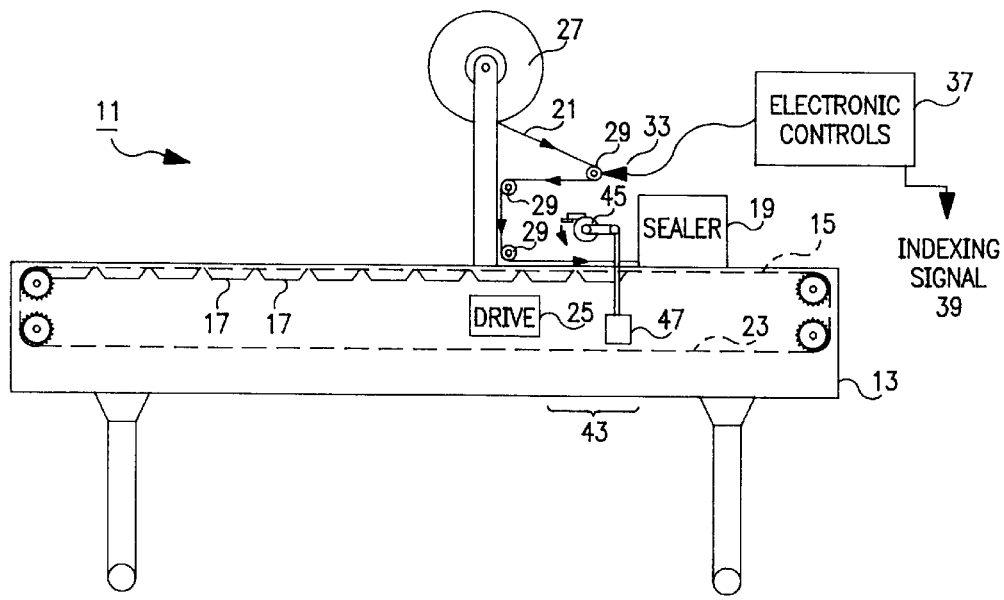
FIG. 1 is a side view of in block representation of the package sealing machine of the present invention with registration structure.

The present invention, FIG. 1, is a registration system incorporated into a tray sealing packaging machine 11. This tray sealing machine has a frame 13, which supports a plate conveyor 15 for transporting a sequence of trays 17 through a sealer station 19 where a sealing film from a ribbon 21 is heat sealed onto the top edges of each tray 17.

The plate conveyor 15 is chain driven 23 from a central electrical motor drive 25. The sealing film is fed to the sealer station 19 by a delivery structure which includes a supply roll 27 and a series of feed rolls 29. The film come off of the supply roll 27 as a ribbon 21 and ends up in parallel to the top faces of the trays 17 on the conveyor 15 as the trays 17 enter the sealer station 19.

Figure 5:
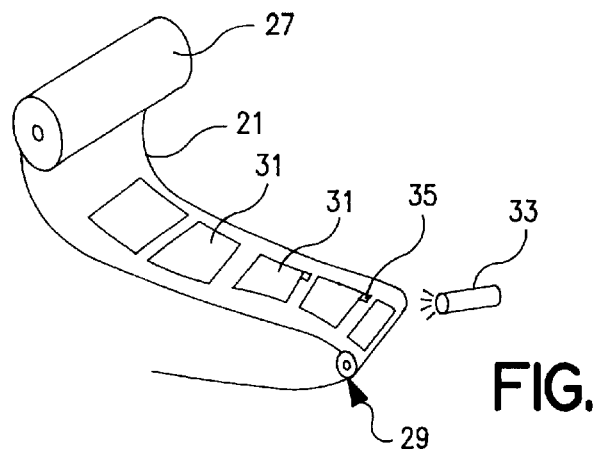
FIG. 5 shows the sealing film ribbon and electric eye optical sensor.

The ribbon carries indicia or text in repetitive segments 31 (FIG. 5, below). This indicia must be centered on each tray 17 when the film 21 is heat sealed to each tray 17. An optical sensor 33, such as an electric eye device is used to locate repetitive registration marks 35 (FIG. 5) on the film ribbon 21 thereby indicating the position of each indicia segment 31. The output from this optical sensor 33 is connected to an electronic control circuit 37. These controls 37 generate an indexing signal 39 when a registration mark 35 detection by the optical scanner 33 is out of synchronization with the timing of the packaging machine 11 operation as determined by a central timing cam 41 (FIG. 2).

The indexing signal 39 is sent to an indexing structure 43 which will be discussed in detail below. The indexing structure 43, however, includes a rotating indexing shaft 45 whose height position is controlled by an air cylinder 47.

Figure 2:
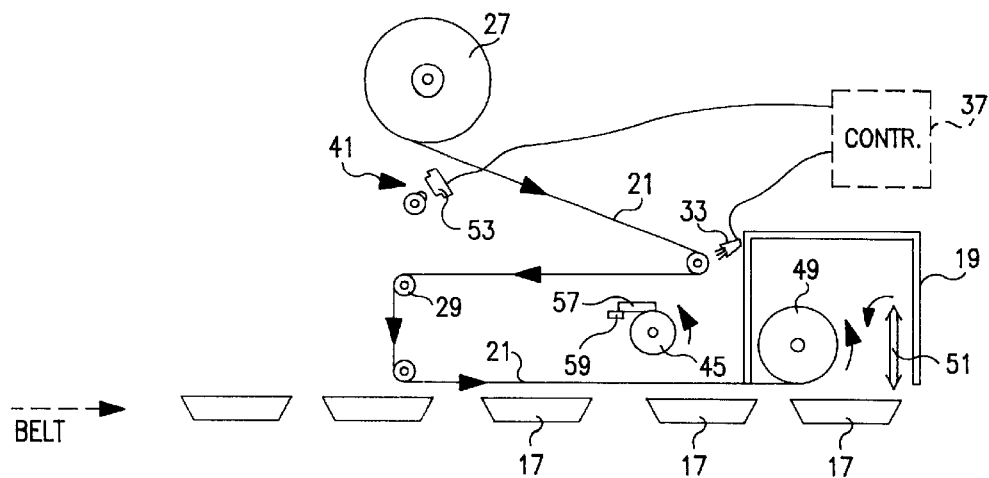
FIG. 2 is a detailed block representation of the registration apparatus with the indexing shaft in the raised position.

The heat sealer station 19, FIG. 2, includes a heat sealer drum 49 and a cutting knife 51 at the discharge side of the heat sealer drum 49. Both the drum 49 and the knife 51 rotate at the speed of the machine 11 and are driven off of the central drive motor 25 and chain drive connected thereto. The heat sealer drum 49 comes in contact with the film ribbon 21 and the top edges of each tray 17 sealing the two together. The sealing of successive trays helps to feed the film ribbon 21 into the sealer station 19.

The feed structure and the operation of the machine 11 will from time to time cause a stretching of the film 21 thereby creating a miss-registration of the film indicia segments 31 and the trays 17. Typically, the indicia segments 31 will fall behind the position of the trays 17. If the film ribbon 21 is pulled forward with respect to tray 17 position, registration will be corrected.

Pitch is a term of art relating to the length of an object. The pitch of the film ribbon 21 segments 31 is the lineal distance on the film each segment covers. The pitch of the tray is the length of the tray and is generally less than the pitch of the film 21. This allows for overlap extension of the cut film and a spacing between successive trays 17 for the operation of the rotating cutter (cutting knife) 51.

The central timing cam 41, FIG. 2, has a shaft which is sprocket and chain driven (not shown) from the central drive motor 25 to operate in synchronism with all of the other operating components of the machine 11. The cam 41 pick up 53 can be a magnetic sensor or an electrical contact points to generate a timing pulse signal to the controls 37. Normally, the rotating indexing shaft 5 is in a raised position above the work flow of the film ribbon 21 and trays 17, FIG.

Figure 4:
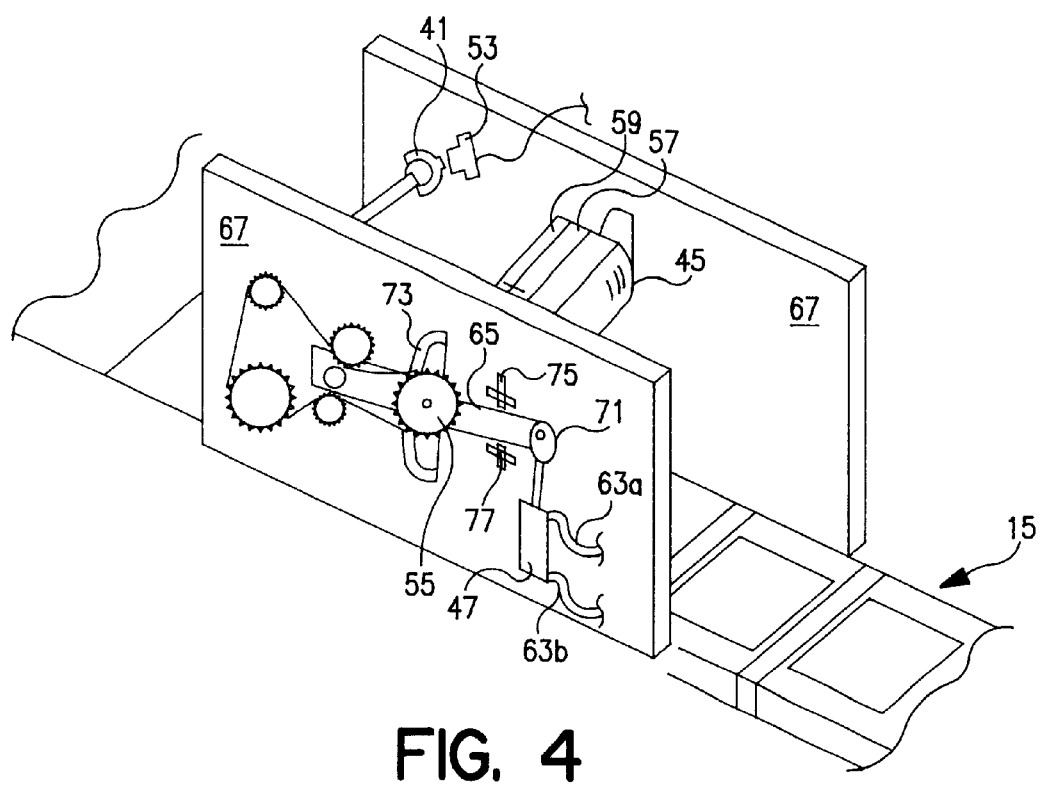
FIG. 4 is a perspective view of the indexing shaft, plate conveyor, pivot lever bar, air piston, timing cam and sprocket chain drive of the invention.

2. This indexing shaft 45 is sprocket and chain driven from the central drive motor 25. Normally, there is a 1 to 1 drive sprocket 55 (FIG. 4). If multiple heat tacking bars 57, each with its own indexing blade 59 are used, a gear reduction sprocket can be substituted. This would reduce the speed of rotation of the indexing shaft 45 to be in synchronization with the operation of the machine as determined by the speed of the timing cam 41.

Mounted on the rotating indexing shaft 45 is a tangentially protruding heat tacking bar 57. Located on the inside outer edge of this heat tacking bar 57 is an indexing blade 59. The lengths of the indexing drum 45, the heat tacking bar 57 and indexing blade 59 are sufficient to extend across the width of the sealing film ribbon 21.

Figure 3:
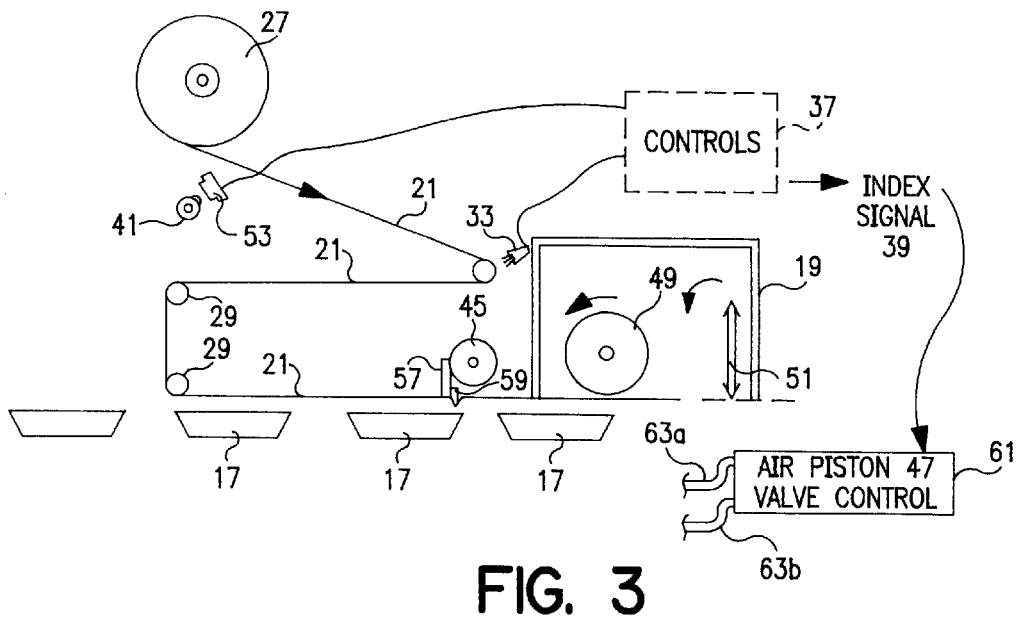
FIG. 3 is detailed block representation of the registration apparatus with the indexing shaft in the lowered position.

When an index signal 39 is sent from the controls 37 to the valve control 61 for the air cylinder 47, FIG. 3, the valves 61 operates the air cylinder through the air supply lines 63a, 63b. The air cylinder 47 (FIGS. 1, 4) operates to lower the indexing shaft 45 onto the path of the film ribbon 21, with the heat tacking bar 57 and its carried indexing blade 59 both extending downward. In this position, the indexing blade 59 engages the film ribbon 21 and moves a small section of it downward. As the film ribbon 21 down line is heat sealed to a tray 17, this movement of the indexing blade 59 causes the up line portion of the film ribbon 21 to move forward (down line) with respect to the tray 17 position thereby adjusting the position of each successive up line indicia segment 31 with respect to the position of each up line tray 17.

The upward and downward movement of the indexing drum 45 is controlled by the movement of a pivoted lever pair 65, FIG. 4. This pair of pivot bars 65 ride one each, on the respective outside of the side plates 67 of the machine 11 through which the plate conveyor 15 operates. These lever pivot bars 65 are pinned 69 at one end and carry the index shaft 45 and sprocket 55 at a mid-point. The free end of one of the lever pivot bars 65 is connected to the output shaft of that air cylinder 47 via a pivoting link 71. The shaft for the indexing drum 45 extends through a longitudinal, vertical extending slot 73 in the side plate 67.

When the air cylinder 47 is activated through its air supply lines 63a, 63b, the indexing drum is raised and lowered. A mechanical upper stop 75 and a lower stop 77, fixed to the side plate 67, intercepts the pivoting lever arm 65 to limit its movement. Each stop 75, 77 contains a screw adjustment for changing the mechanical stop position.

Figure 6:
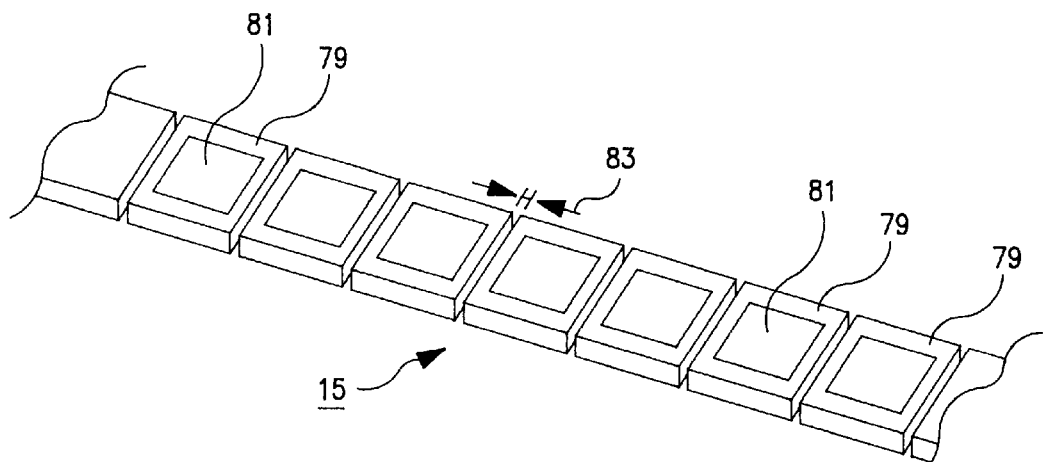
FIG. 6 is a partial perspective view of the plates of the tray conveyor.

The plate conveyor 15 has a plurality of flat plates 79, FIG. 6, moved by a chain along a guide way. Each flat plate 79 carries a cut out opening 81 for receiving and holding a tray 17 to be sealed. The plates 79 are spaced apart a nominal distance 83 of about one-quarter inches.

Figure 7:
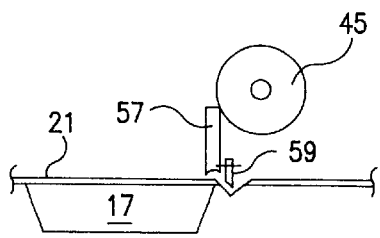
FIG. 7 shows a detailed partial side view of the indexing shaft, heat tacking bar and indexing blade intercepting the film ribbon at the front leading edge of a tray.
Figure 8:
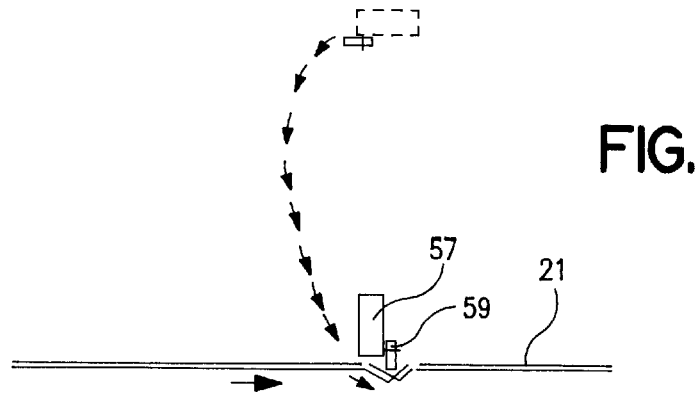
FIG. 8 shows the path of movement of the heat tacking bar and indexing blade from their upward rotating position to their film index and tack downward position.

When in the down position the film ribbon 21 is indexed by the indexing blade 59 intercepting the ribbon 21 and moving a portion out of its line of flow, FIG. 7. The heat tacking bar 57 contacts the film ribbon 21 and the leading edge of the tray 17 to tack seal the ribbon 21 to that tray 17 to maintain the indexed adjustment when the indexing drum 45 and associated structure is removed (moved upward). With the shaft 45 rotating at the same time as it is lowered onto the film ribbon 21, the path of the heat tacking bar 57 and the indexing blade 59 is elliptical, FIG. 8. This path allows for the interception of the film with a motion in the normal direction of movement of the film ribbon 21. The extension of the indexing blade 59 beyond the end of the heat tacking bar 57 is adjustable by moving a series of securing pins. The physical extension of the blade 59 beyond the bar 57 can be fixed at distances up to one-quarter inches.

Figure 9:
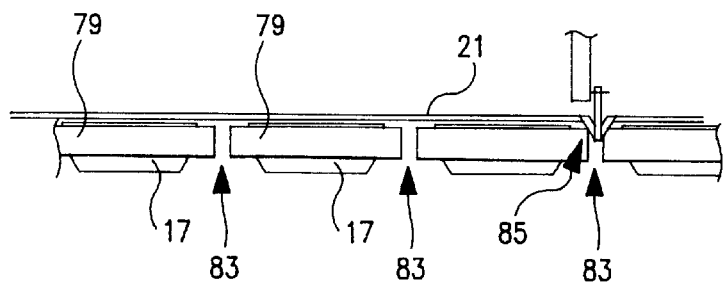
FIG. 9 shows the indexing blade pushing the film into the slot between successive conveyor plates to index forward the film with respect to the line of trays.

The timing of the downward movement of the indexing blade 59 is such that it intercepts the film ribbon 21 above a slot 83 between adjoining plates 79 in the moving plate conveyor 15, FIG. 9. The intercepted film ribbon 21 is pulled slightly into the slot a distance of from one-sixteenth inch (1/16) to three-sixteenth inch (3/16) a function of the insert adjustment and the settings for the lower stop 77 (FIG. 4). This movement presses the film ribbon 21 firmly against the leading edge 85 of the tray 17 for the heat tacking bar 57 to hold accurately the indexed position established.

Many changes can be made in the above described structure without departing from the intent and scope of the invention. This structure therefore is to be considered as illustrative of the invention and is not to be read in the limiting sense.

What is claimed is:

1. A sealed tray packaging machine with a registration system, comprising:

a plate conveyor having a plurality of plate segments each for carrying a tray to be sealed;

a rotary heat sealing drum positioned over the discharge end of the conveyor, said drum coming in contact with the top edges of every tray passing thereunder on said plate conveyor, for sealing any film laying on top of each tray to the top edges thereof;

a film ribbon delivery structure for holding a roll of sealing film and delivering it in parallel above the tray carrying plate conveyor onto and parallel to the top edge of trays carried by said plate conveyor, and thereby under said rotary heat sealing drum;

a cutter to cut the film ribbon between successive trays, said cutter being positioned at the discharge side of said rotary heat seal drum;

an electrical control circuit and timing cam for generating timing signals to said electrical control circuit, a sensor for sensing registration marks on the film delivered by said film delivery structure and sending registration mark sensed signals to said control circuit;

wherein said control circuit initiates an indexing signal when said registration mark sensed signal is not synchronized with said cam generated timing signal;

an indexing blade and heat film tacker structure above said conveyor connected to said control circuit to receive an indexing signal and to operate to intercept the film ribbon and move the intercepted point down thereby pulling the film ribbon forward with respect to a tray position and to tack seal said forwardly pulled film against the leading edge of an adjacent tray;

a drive motor and drive chain connected to move said conveyor, said film feed structure, said heat seal drum, said cutter and said indexing blade and heat film tacker; and said structure comprising an indexing blade mounted on a rotating heat tacking bar and a vertical positioning structure connected to said control to reciprocate said tacking bar to intercept said film ribbon.

2. The packaging machine of claim 1 wherein said indexing blade and film tacker structure further comprising:

said index rotating shaft carrying said heat tacking bar extending tangentially from the circumference thereof;

said indexing blade extending from the inside outward edge of said heat tacking bar;

a sprocket drive carrying said index rotating drum and being connected to said chain drive system for rotating said index rotating drum, heat tacking bar and indexing blade; and said vertical positioning structure connected to said control circuit for raising said sprocket drive to a first position and lowering it to a second position, whereof when in said second position said indexing bar will intercept a film ribbon and move it downward thereby pulling it forward, and said heat tacking bar will touch said film at the leading edge of the adjacent tray.

3. The packaging machine of claim 2 wherein said indexing blade and heat film tacker structure vertical positioning system includes paired lever bars pinned at one end for allowing a pivoting movement in the vertical plane,; and wherein said sprocket drive includes an axle extending between the free ends of said lever bars, and a speed syncronization sprocket on one end of said axle, said speed snychronization sprocket being connected to said drive chain.

4. The packaging machine of claim 3 wherein said vertical positioning structure includes an air cylinder mounted with its output shaft connected to raise and lower the free end said lever bars thereby raising and lowering said rotating indexing drum, indexing blade and heat tacking bar; a valved air supply connected to operate said air cylinder; and a control line connection to said control circuit whereby said indexing signal generated by said control circuit operates said air supply valves.

5. The packaging machine of claim 4 wherein said vertical positioning structure also includes a vertical position stop and a lower position stop for said lever bar movement.

6. The packaging machine of claim 5 wherein said air cylinder output shaft is connected to the free end of one of said pivoting lever bars by a pivoting link; and wherein said lever bar movement is intercepted by an upper stop member mounted in its plane of movement, and lower stop member mounted in its plane of movement.

7. The packaging machine of claim 6 wherein said upper and lower stop members are each mounted to a respective bracket and each includes a screw adjustment for positioning each respective stop and thereby limiting said lever bar movement.

8. The packaging machine of claim 7 wherein said cutter is a rotating blade cutter connected to said chain drive.

9. The packaging machine of claim 8 wherein said sensor is an optical sensor connected to said control circuit and mounted to read the registration marks on said film ribbon prior to said index indexing blade and heat film tacker structure position.

10. The packaging machine of claim 9 wherein the extension of said indexing blade is fixedly adjustable.

11. The packaging machine of claim 10 wherein said plate conveyor has an opening slot between each plate in said conveyor; and wherein said indexing blade extends into a respective slot between plates when said lower position stop intercepts said lever moved by said air cylinder during said film position indexing.

12. The packaging system of claim 11 wherein the slots between conveyor plates are approximately ¼ inches wide, said indexing blade is approximately ¹⁄₁₆ inches wide and said blade extension is fixedly adjustable from approximately ¹⁄₁₆ to ³⁄₁₆ inches.

13. A method of registration correction in a tray sealing packaging machine, having a continuous product flow therethrough, comprising the steps of:

loading trays to be sealed, sequentially on a conveyor, which carries them through the machine;

passing a film ribbon above the sequential trays in the direction of travel of said conveyor;

passing said trays and film ribbon under a heat sealing drum to heat seal the film to each tray;

carrying a said heat sealed tray with the film ribbon attached to a cutting station; and cutting the film on each side of each tray after said heat sealing;

wherein each tray sealing and film cutting determines a machine cycle; also including the steps of optically monitoring for registration marks on said film;

driving all operations of said packaging machine in synchronization from a single drive source;

generating timing pulses in synchronization from said single drive source;

determining miss-registration of said film ribbon to said sequential trays;

indexing the position of said film above said sequential trays at a point up stream on said conveyor from said heat sealing step location, said indexing being by a fixed incremental distance; and repeating said miss-registration step and said indexing of film position step in each successive machine cycle until registration is re-established;

wherein said indexing step moves said film relative position forward downstream with respect to the relative position of a respective tray while said film and tray are moving downstream; and securing a portion of said forwardly moved film to said respective tray upstream of said heat sealing drum upon completion of said relative forward movement of said film to said respective tray while said film and respective tray are moving downstream.

14. The registration method of claim 13 wherein said film position indexing step further includes the steps of:

establishing a film pushing and tacking apparatus at a location upstream from said heat sealing step location and operating said pushing portion in a downward and forward downstream curvilinear motion whereof the following steps are performed;

pushing a moving section of said film out of its line of travel thereby pulling the trailing section of said film forward downstream with respect to the relative position of a moving tray; and heat tacking a portion of said film ribbon to the leading edge of the tray adjacent the section of said film pushed to fix the indexed position of said film upstream from said heat sealing step location.

15. A registration apparatus for a tray sealing packaging machine, said machine having a conveyor establishing a direction of work movement, and carrying trays through a heat sealing station, and a film handling structure for passing a film ribbon over the trays to be sealed at said heat sealing station with said film, the movement of the components of said packaging machine being driven in synchronization from a single constantly operating drive, and an optical sensor for detecting the position of registration marks on said film ribbon relative to tray position in each machine cycle, the improvement comprising:

means for indexing said film ribbon forward in the direction of work movement in response to said sensor detecting miss-registration of said marks and independent of the movement of the trays and machine components, said indexing adjusting the relative position of said indexed film ribbon to said trays on said conveyor;

means for tacking said film ribbon to a tray to hold said index adjustment of said film ribbon to said tray; and said structure comprising an indexing blade mounted on a rotating heat tacking bar and a vertical positioning structure connected to said control to reciprocate said tacking bar to intercept said film ribbon.

16. The registration apparatus of claim 15 wherein said indexing means and said tacking means are connected to said single constantly operating drive.

17. The registration apparatus of claim 16 wherein said indexing means and said tacking means operate without interrupting the timing, speed and operation of the packaging machine.

18. The registration apparatus of claim 17 wherein said indexing means adjustment of film ribbon to tray position is by a predetermined fixed amount, wherein said adjustment is fixedly selectable.

* * * * *